(12) United States Patent
Groshens

(10) Patent No.: US 8,029,602 B1
(45) Date of Patent: Oct. 4, 2011

(54) CHEMICAL HYDROGEN STORAGE MATERIALS HAVING GUANIDINIUM BOROHYDRIDE

(75) Inventor: Thomas J. Groshens, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 278 days.

(21) Appl. No.: 12/398,249

(22) Filed: Mar. 5, 2009

(51) Int. Cl.
*H01M 8/06* (2006.01)
*C07F 5/02* (2006.01)
(52) U.S. Cl. ........................................ 95/90; 423/658.2
(58) Field of Classification Search ........ 95/90; 96/108; 206/0.7; 502/526; 429/416; 423/248, 648.1, 423/658.2
See application file for complete search history.

(56) References Cited

U.S. PATENT DOCUMENTS

| 6,991,773 | B2 * | 1/2006 | Jhi et al. ..................... 423/648.1 |
| 7,316,718 | B2 * | 1/2008 | Amendola et al. ................. 48/61 |
| 7,361,213 | B2 * | 4/2008 | Narula et al. ................... 96/108 |
| 2007/0128475 | A1 * | 6/2007 | Blacquiere et al. ............. 429/13 |
| 2008/0070072 | A1 * | 3/2008 | Mohajeri et al. ................ 429/20 |
| 2008/0307794 | A1 * | 12/2008 | Graupner et al. ............... 60/780 |

FOREIGN PATENT DOCUMENTS

SU 297638 A * 11/1969

* cited by examiner

Primary Examiner — Frank Lawrence, Jr.
(74) Attorney, Agent, or Firm — Charlene A. Haley

(57) ABSTRACT

A fuel cell and a method for chemically storing hydrogen. Embodiments of the fuel cell include a mixture having at least one boron-nitrogen-hydrogen compound and a reactive hydride where the mixture has more than about 10 wt % hydrogen density and a hydrogen storage density of about 0.1 kg $H_2 l^{-1}$.

13 Claims, 1 Drawing Sheet

CHEMICAL HYDROGEN STORAGE MATERIALS HAVING GUANIDINIUM BOROHYDRIDE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention relates to a composition and method of storing hydrogen for transportation utilizing long lasting hydrogen powered fuel cell systems, more specifically, storing hydrogen material where fuel cell systems has four times the energy density of the batteries currently utilized, and that the fuel cells can be replaced simply and quickly.

BACKGROUND OF THE INVENTION

Historically, the ability to store hydrogen at high volumetric and gravimetric density and release it on demand has been a crucial limiting factor in realizing the full potential of a number of technologies such as portable chemical laser systems. Most recently, the need for a high density hydrogen storage source for fuel cell systems has emerged as new requirements for portable electric power sources exceed current and future battery capabilities. Undeniably, further advances in state of the art hydrogen storage technology are still necessary and vital to the widespread implementation of fuel cells as high power density portable systems. The difficult challenge to improving chemical hydrogen storage methods is to find compounds or mixtures with high storage capacity that also exhibit clean, efficient and fast hydrogen release mechanisms. In addition, to attain maximum overall system storage capacity, the fuel must require minimal thermal management (be close to thermoneutral) to reduce the volume and weight of ancillary hardware. This becomes particularly difficult to achieve in small scale applications. For these systems it may be advantageous to employ exothermic self-sustaining reactions to generate hydrogen provided sufficient thermal control can be maintained.

There exists a need in the art for a composition/method of storing hydrogen for transportation utilizing long lasting hydrogen powered fuel cell systems. Furthermore, there exits a need for a method of storing hydrogen material for fuel cell systems having four times the energy density of the batteries currently utilized, and that the fuel cells can be replaced simply and quickly.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Figure 1:
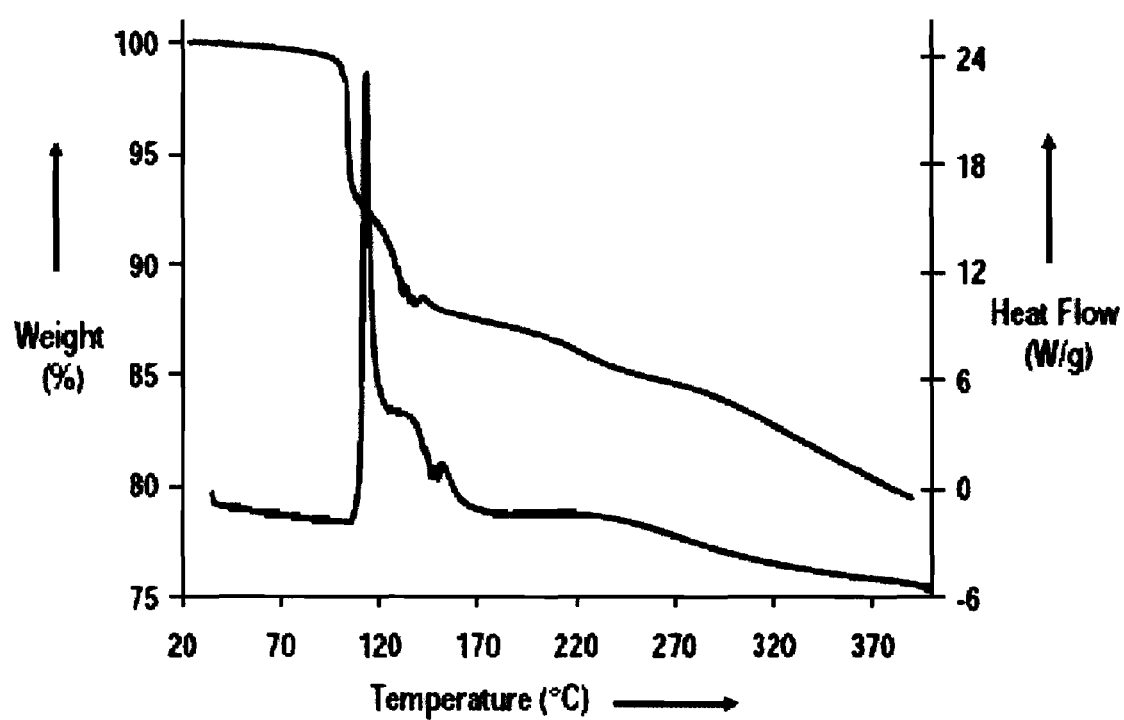
FIG. 1 is a graph illustrating separate experiments combining DSC and TGA traces showing integrated heat flow from 110° C. to 165° C. was 8034 $Jg^{-1}$, according to embodiments of the invention.

Embodiments of the invention generally relate to relates to methods for chemically storing hydrogen and chemical hydrogen storage materials for fuel cell systems including; a stoichiometric mixture having at least one boron-nitrogen-carbon-hydrogen compound, wherein the stoichiometric mixture has more than about 10 wt % hydrogen density and a hydrogen storage density of about 0.1 kg $H_2 l^{-1}$.

Another embodiment of the invention relates to a process for manufacturing a chemical hydrogen storage material for fuel cell systems including: preparing a desired stoichiometric mixture comprising at least one boron-nitrogen-carbon-hydrogen compound, mixing at least one reactive hydride with the boron-nitrogen-carbon-hydrogen compound to produce a stoichiometric mixture having more than 10 wt % hydrogen density and a hydrogen storage density of about 0.1 kg $H_2 l^{-1}$.

Yet another embodiment of the invention relates to a method for chemically storing hydrogen including; combining a stoichiometric mixture having at least one boron-nitrogen-hydrogen compound, wherein the stoichiometric mixture has more than about 10 wt % hydrogen density and a hydrogen storage density of about 0.1 kg $H_2 l^{-1}$.

The storage material in embodiments at least one boron-nitrogen-carbon-hydrogen compound including, but is not limited to, guanidinium borohydride (GBH). In other embodiments, the mixture further includes at least one reactive hydride. These hydrides include, but are not limited to, ethylenediamine bisborane (EDB). Other embodiments may include additives. These additives include, but are not limited to, tetra-n-butylammonium borohydride.

In other process and method embodiments, the storage material is undergoing a rapid self-sustaining thermal decomposition reaction releasing more than 10 wt % hydrogen gas. Still yet in other embodiments, the methods include the steps of initiating the process by a hot point source greater than about 180° C. so that a resistively heated bridge wire will undergo a rapid self-sustaining thermal decomposition reaction releasing more than 10 wt % hydrogen gas.

In this research effort to develop new manageable chemical hydrogen storage sources we investigated hydrogen generation from the autogenous ammonolysis reactions of boron hydrides including guanidinium borohydride (GBH) and ethylenediamine bisborane (EDB). Our results find these compounds provide a promising, low cost, reliable, and safe high-density chemical hydrogen storage source for applications where very fast hydrogen generation on demand is required.

Boron-nitrogen-hydrogen compounds are of interest for hydrogen storage providing high weight percent hydrogen materials where the corresponding protic and hydridic character of the hydrogens on the nitrogen and boron respectively allows a facile $H_2$ elimination pathway. In addition, the formation of B—N bonds in the products with a lower enthalpy of formation than, for example, B—O bonds, reduces the systems thermal load and provides new lower energy chemical pathways for regenerating the storage compounds. As a potential hydrogen-storage source the borohydride ion ($BH_4^-$) at 27.2 wt % $H_2$ can provide exceptionally high $H_2$ density if an appropriate counter cation is chosen that contributes sufficient protons for hydrogen formation without adding excess dead weight. Unfortunately, the ideal exemplar, ammonium borohydride [$NH_4$][$BH_4$], at 24.5 wt % $H_2$ is thermally unstable. As a result research on discrete chemical compounds for hydrogen storage has focused on the ammonia borane (AB) adduct, $NH_3BH_3$, with 19.6 wt % hydrogen.

However, results from extensive studies on the pyrolysis chemistry of AB show the thermally induced reaction chemistry is complex and highly dependant on process conditions. Mixtures of volatile, pyrophoric, toxic, and thermally more stable intermediate products are formed in initial reaction steps requiring significant thermal energy input to obtain a high yield of hydrogen.

As potential alternatives to AB for hydrogen storage there are a few stable borohydride salts with a sufficient number of protic hydrogens for reaction with most of the hydridic borohydride hydrogens. One example, $[Mg(NH_3)_2][BH_4]_2$ with 16.0 wt % $H_2$ was successfully demonstrated as a $H_2$ source for a portable chemical laser application. A Rietveld refinement of the crystal structure and the endothermic decomposition of this compound to yield 13.1 wt % hydrogen as 6 equiv. $H_2$ along with $NH_3$ impurity has been reported. A second example, guanidinium borohydride (GBH) $[C(NH_2)_3]^+[BH_4]^-$ with 13.5 wt % $H_2$ (10.8 wt % $H_2$ thermally accessible by ammonolysis as 4 equivalents of $H_2$) has not been investigated as a hydrogen source. With four hydridic borohydride bonds and six protic N—H bonds GBH has only a modest dead weight penalty in the guanidinium ion. The higher thermal stability of the borohydride salt of the guanidinium ion, $[C(NH_2)_3]^+$, in comparison to the ammonium salt is a consequence the higher basicity of guanidine (pKa=13.71) than ammonia (pKa=9.21). Guanidinium borohydride was first reported in 1954 by Schechter. Titov and coworkers latter published additional synthetic methods, properties (e.g. $\Delta H°_f = -111$ kJmol$^{-1}$), and thermal studies showing decomposition of GBH begins at 100° C.

The structure of GBH determined by single crystal x-ray diffraction in NAWCWD laboratory is consistent with the results of Jackson where the crystal packing is controlled by dihydrogen bonding interactions and can be described in terms of stacks and layers of one dimensional GBH tapes as shown in the ORTEP diagram below with the close hydrogen-hydrogen bonding interactions depicted in (A) by thin lines.

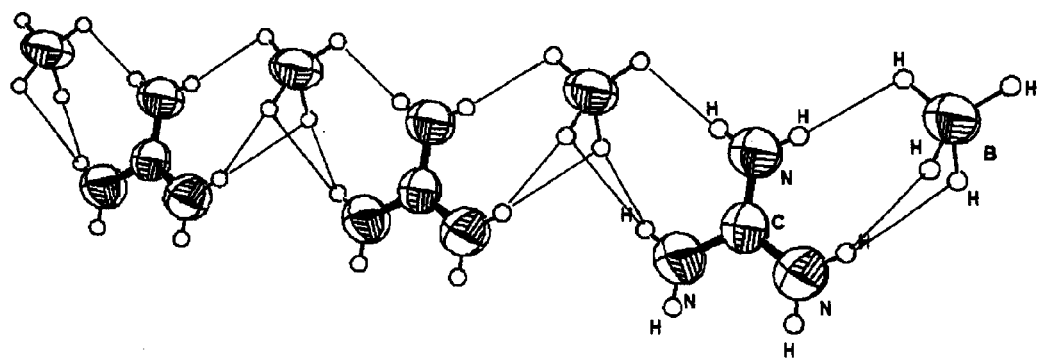

Within the tapes, hydrogens on the guanidinium are involved in close dihydrogen bonding to the hydrides of the borohydride providing a low activation energy path for elimination of hydrogen in the solid. The calculated density of GBH is 0.905 gcm$^{-3}$, significantly less than the pycnometrically measured value of 0.99 gcm$^{-3}$ reported by Titov. Based on our results at 10.8 wt % hydrogen GBH provides a material hydrogen storage density of 0.0977 kg H$_2$l$^{-1}$.

For our studies GBH was synthesized in 65-75% yield from a metathesis reaction of either guanidinium carbonate or the sulfate and sodium borohydride in anhydrous isopropanol at room temperature. As previously reported the product was an air stable slightly hygroscopic colorless crystalline solid. A melting point of 102° C. with decomposition was observed while heating the sample at a rate of about 10° C./min. For GBH samples maintained at elevated temperature in dry nitrogen no gas evolution was evident after several days at 55° C. Very slow hydrogen evolution begins at about 60° C. Less than 0.25% of the available hydrogen evolved after 24 hr at 60° C. (less than 0.025 wt % loss) and 2.1% of available H$_2$ was generated after 48 hr at 60° C. The lower temperature (55-60° C.) thermal decomposition appears to be self-catalyzing where the rate of hydrogen evolution slowly increases with time at elevated temperature.

When initiated with a hot point source (greater than 180° C.) samples of neat guanidinium borohydride underwent a very fast self-sustaining thermal decomposition (SSTD) reaction. The reaction rapidly generated hydrogen gas and produced a low density white residual ash. It was apparent from examination of the foam residue that during the SSTD reaction solid GBH generates a transient liquid phase in the reaction zone which froths as hydrogen is released before producing the final infusible solid product. Hydrogen yields above 10 wt % were routinely obtained with greater than 95 mol % purity. A maximum reaction zone temperature of 450° C. was measured using thermocouples positioned in the reacting solid and exit gas. The only volatile products identified from the reaction were hydrogen (95-97%) and ammonia (3-5%) presumably according to the two general reaction paths depicted in Scheme 1. Gas chromatographic analysis of the evolved gases was negative for the presence of nitrogen which was reported by Titov to have been generated during pyrolysis of an intermediate product at 300° C. in a previous study.

Scheme 1
GBH SSTD reactions. The example SSTD reaction produced 10.63 wt % H$_2$ and 4.09 wt % NH$_3$ (a gas stream composition of 95.65 mol % H$_2$ and 4.35 mol % NH$_3$).

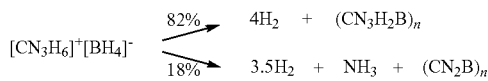

The SSTD reaction was observed for samples of GBH in a vacuum, under a nitrogen atmosphere (from 15-4000 psi) and in air on samples as large as 10 grams without incident. (CAUTION! The decomposition reaction of GBH is rapid producing heat and large amounts of combustible gas. The reaction is capable of generating extremely rapid high pressurization of vessels if confined. Our safety tests show GBH powder is insensitive to impact and friction initiation but was found to be sensitive to initiation by electrostatic discharge.) In the absence of an external ignition source no auto-ignition of the evolved hydrogen was observed when the reaction was conducted unconfined in air. The only other reported example of a borane amine compound exhibiting a self sustaining thermal decomposition reaction without preheating the entire sample is hydrazine bisborane (HBB). However for HBB the self-sustaining thermal decomposition reaction readily transitions from a deflagration to detonation. This behavior combined with the toxicity of hydrazine prevented further consideration of HBB for hydrogen storage.

The DSC trace of GBH (FIG. 1) heated at a rate of 8° C.min-1 exhibits a sharp exotherm at about 110° C. followed by another broad exothermic peak extending out to about 175° C. The heat of reaction estimated from the DSC measurements is approximately −60 kJmol-1 (integrated Heat Flow from 110° C. to 165° C. is 803 Jg-1), less than one third of the heat generated by the hydrolysis of sodium borohydride (~210 kJmol-1). For GBH the estimated average heat of reaction for H2 formation (−15 kJmole-1 H2 for GHB) is only slightly higher than the value reported for the elimination of the first two equivalents of H2 for AB (−11 kJmole-1 H2). TGA analysis (FIG. 1) shows stepwise release of products with the expected 15% mass loss (Scheme 1) reached at about 140° C.

While the results of our investigation on the use of GBH as a hydrogen storage material are promising, the amount of ammonia in the product stream is problematic for PEM fuel cell applications requiring H$_2$ treatment with an acidic scrubbing medium before use. Therefore, to improve the yield and purity of the hydrogen product as well as control the reaction rate and thermal characteristics, preliminary screening studies were conducted on mixtures of GBH with other reactive hydride additives. In general addition of up to 25 wt % active hydrides (MgH$_2$, NaBH$_4$, LiAlH$_4$, Me$_4$NBH$_4$) had little or no effect on the amount of ammonia produced and did not contribute to the hydrogen production. With the addition of tetra-n-butylammonium borohydride (n-Bu$_4$NBH$_4$) the mixture failed to sustain a decomposition reaction with as little as 1 wt % additive.

A remarkable improvement in the purity of the hydrogen product was observed from mixtures of GBH and ethylenediamine bisborane (EDB). With 16.08 wt % H$_2$ (9.2 wt % H$_2$ thermally available by amonolysis of 4 equivalents H$_2$) EDB is a white crystalline solid (density of 0.82 gcm$^{-3}$) that is stable in dry air and decomposes rapidly above approximately 90° C. The addition of EDB to GBH results in a decrease in ammonia production from the SSTD reaction (Table 1) without significantly affecting the gravimetric hydrogen yield.

TABLE 1

GBH/EDB SSTD Reaction Products[a]

| Wt % GBH | Wt % EDB | H$_2$ Yield, Wt % | Mole % NH$_3$[b] |
|---|---|---|---|
| 100 | 0 | 10.6 | 4.1 |
| 89.5 | 11.5 | 10.4 | 2.7 |
| 60 | 40 | 10.4 | 0.1 |
| 46 | 54[c] | 9.6 | 0.069 |
| 40 | 60[d] | 10.1 | 0.026 |

[a]For pellets compressed to approximately 60% TMD
[b]NH$_3$ concentration in gas stream
[c]Stoichiometric mix
[d]not self-sustaining While no special precautions were taken during the storage of GBH during our investigation with only a slight odor noted after handling samples for a year, mixtures of GBH/EDB stored unprotected in air underwent a slow reaction and were inactive after several months. Samples of the mix stored under dry nitrogen for the same period were still reactive.

In conclusion, GBH was found to reliably undergo a tractable SSTD reaction when initiated by a heated bridge wire. As a hydrogen storage material GBH provides a lower adiabatic reaction temperature of 450° C. and a higher storage density than previous borohydride compositions using, for example, mixtures of sodium borohydride with an oxidizer. The only gaseous products identified from the SSTD reaction of GBH were $H_2$ and $NH_3$ where the hydrogen yield was above 10 wt %, nearly quantitative. The SSTD reaction of mixtures of GBH and EDB rapidly produces a useable $H_2$ gas stream for PEM fuel cell applications with minimal $NH_3$ scrubbing required. With proper engineering considerations the hydrogen storage capacity in small scale systems may be improved using the exothermic SSTD reaction of GBH/EDB mixtures by reducing the required thermal input energy to a minimum. For large-scale applications the risk of thermal runaway may be mitigated using small amounts of additives such as tetra-n-butylammonium borohydride. Further investigations are underway on the use of GBH in conjunction with other $H_2$ storage compounds that may lead to new hydrogen storage materials with significantly higher than 10 wt % $H_2$ density.

There may be other uses for portable hydrogen storage where this material could be employed such as laser systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A chemical hydrogen storage material for fuel cell systems, comprising:
    at least one additive including tetra-n-butylammonium borohydride; and
    a stoichiometric mixture having at least one boron-nitrogen-carbon-hydrogen compound, wherein said stoichiometric mixture comprises more than about 10 wt % hydrogen density and a hydrogen storage density of about 0.1 kg $H_2 l^{-1}$.

2. A process for manufacturing a chemical hydrogen storage material for fuel cell systems, comprising:
    preparing a desired stoichiometric mixture comprising at least one boron-nitrogen-carbon-hydrogen compound;
    mixing at least one reactive hydride with said boron-nitrogen-carbon-hydrogen compound to produce a stoichiometric mixture having more than 10 wt % hydrogen density and a hydrogen storage density of about 0.1 kg $H_2 l^{-1}$.

3. The process according to claim 2, wherein at least one said boron-nitrogen-carbon-hydrogen compound comprises guanidinium borohydride (GBH).

4. The process according to claim 2, wherein at least one reactive hydride comprises ethylenediamine bisborane (EDB).

5. The process according to claim 2, wherein said mixture further comprises additives.

6. The process according to claim 5, wherein said additives comprises tetra-n-butylammonium borohydride.

7. The process material according to claim 2, further comprising said storage material undergoing a rapid self-sustaining thermal decomposition reaction releasing more than 10 wt % hydrogen gas.

8. The process material according to claim 2, further comprising initiating said process by a hot point source greater than about 180° C. so that said hydrogen storage material will undergo a rapid self-sustaining thermal decomposition reaction releasing more than 10 wt % hydrogen gas.

9. A method for chemically storing hydrogen, comprising:
    combining a stoichiometric mixture having at least one boron-nitrogen-hydrogen compound, wherein said stoichiometric mixture comprises more than about 10 wt % hydrogen density and a hydrogen storage density of about 0.1 kg $H_2 l^{-1}$;
    and wherein the mixture has been prepared by mixing at least one reactive hydride with said boron-nitrogen-hydrogen compound.

10. The method according to claim 9, wherein at least one said boron-nitrogen-hydrogen compound comprises guanidinium borohydride (GBH).

11. The method according to claim 9, wherein said at least one reactive hydride comprises ethylenediamine bisborane (EDB).

12. The method according to claim 9, wherein said mixture further comprises additives.

13. The method according to claim 12, wherein said additives comprises tetra-n-butylammonium borohydride.

* * * * *